United States Patent [19]

Bienwald et al.

[11] 4,412,193
[45] Oct. 25, 1983

[54] RESETTABLE CIRCUIT BREAKER FOR USE IN GROUND FAULT CIRCUIT INTERRUPTERS AND THE LIKE

[75] Inventors: Wolfgang F. Bienwald, Melville; Herbert W. Tumsuden, Jr., Floral Park, both of N.Y.

[73] Assignee: Leviton Manufacturing Company, Inc., Little Neck, N.Y.

[21] Appl. No.: 940,224

[22] Filed: Sep. 7, 1978

[51] Int. Cl.³ ............... H01H 83/02; H01H 73/06
[52] U.S. Cl. .................................... 335/18; 361/42
[58] Field of Search ....................... 335/18; 361/42

[56] References Cited

U.S. PATENT DOCUMENTS 4,010,432  3/1977  Klein et al. ................... 335/18
4,086,549  4/1978  Slater et al. .................. 335/18

Primary Examiner—Harold Broome
Attorney, Agent, or Firm—Paul J. Sutton

[57] ABSTRACT

A resettable circuit breaker has a pair of normally closed contacts through which a load is connected to a power line and means for opening the contacts in response to a predetermined change in electrical current flowing to and from the power line. One of the contacts is mounted on a rocking member which is maintained between a pivot on the base of the apparatus and the armature of a latching solenoid responsive to the predetermined current change by a spring assembly which causes the rocking member to rotate about the pivot means thereby opening and closing the contacts depending on the position of the armature.

5 Claims, 5 Drawing Figures

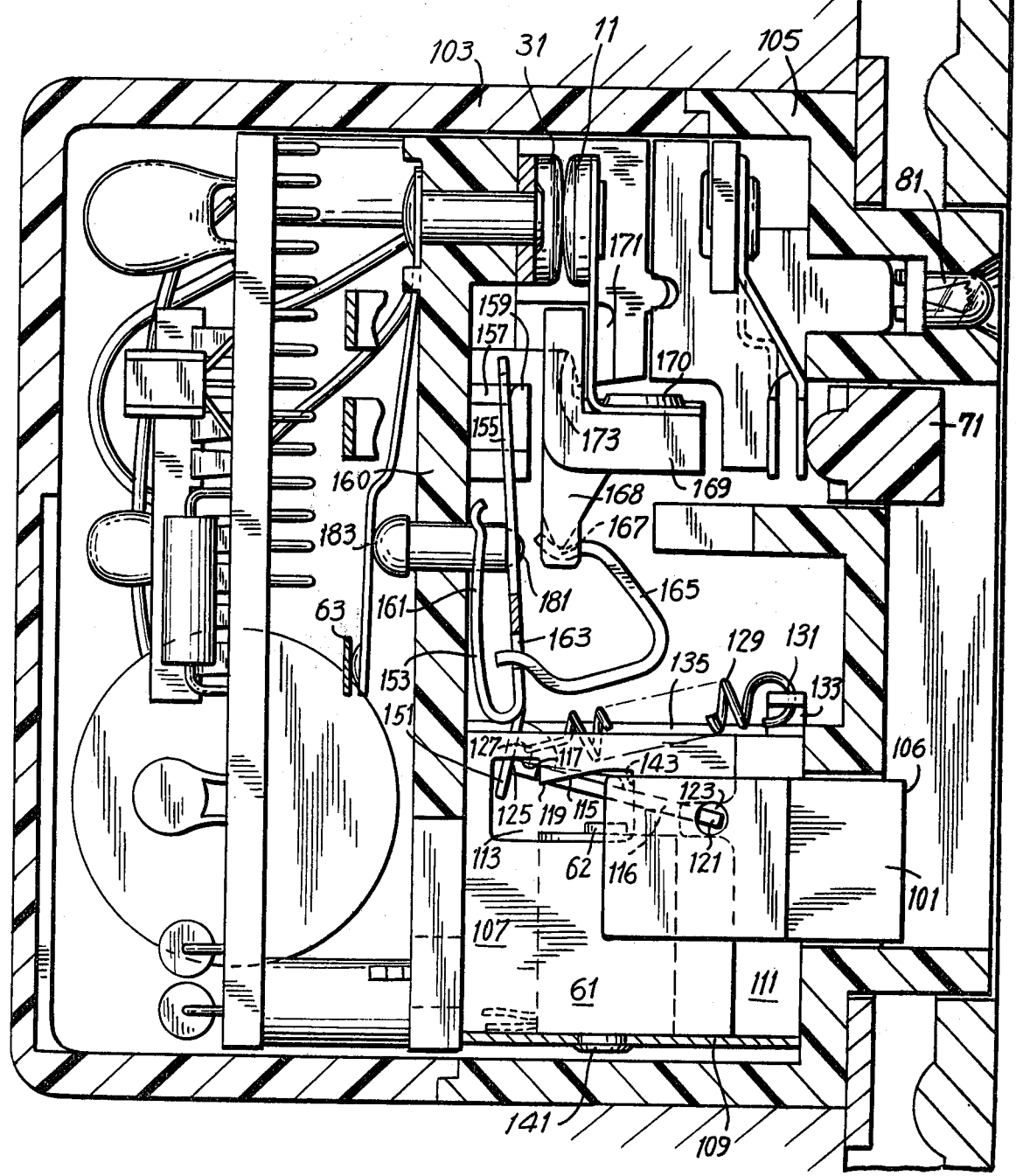

RESETTABLE CIRCUIT BREAKER FOR USE IN GROUND FAULT CIRCUIT INTERRUPTERS AND THE LIKE

BACKGROUND OF THE INVENTION

The danger of electrocution of or serious shock to an individual coming in contact with an appliance surface having an electrical potential differing from ground potential when the individual was also touching a grounded surface created the need for ground fault circuit interrupters. Ground fault circuit interrupts cut off the supply of electric current to a "hot" surface immediately upon flow of electric current to ground through other than the normal return path of the circuit in which the appliance is connected. Early ground fault circuit interrupters continuously measured electrical potential to ground and cut off power to the monitored appliance in response to a predetermined change in potential. These early devices were inherently faulty in that it was difficult to obtain a true ground point from which to measure electrical potential and variations in ground impedance adversely affected their operation.

Improved ground fault circuit interrupters were later developed. These monitored the difference between the electrical currents flowing into and out of the power line to which they were connected. Ideally, the supply and return currents are equal and their difference has a magnitude of zero. Should an external electrical path from the phase or hot side of the supply line to ground be completed, the current at the grounded neutral terminal of the supply line decreases relative to the current at the phase terminal of the line. The improved ground fault circuit interrupters employed a differential transformer which generated a pulse upon the occurrence of an imbalance between the phase and neutral currents and this pulse was applied directly to a solenoid causing the solenoid to actuate thereby opening a set of contacts between the power line and appliance or load. In order to function such ground fault circuit interrupters required very large transformers, too bulky to permit mounting of the ground fault circuit interrupter in a standard wall receptacle and highly sensitive solenoids which like the transformers were very expensive.

Prior art ground fault circuit interrupters were also prone to tripping due to noise on the power line which created momentary imbalance between the phase and neutral currents. Other problems associated with prior art ground fault circuit interrupters included an inability to cut off power if inadvertently wired into a circuit in reverse, that is, with the load terminals connected to the power line and power line terminals connected to the load. In these devices when the ground fault circuit interrupter was connected in reverse, not only was the power continuously supplied to the load irrespective of actuation of the interrupter, but also in cases where the opening of the contacts was accomplished by an eletromagnet, current would continue to flow in the electromagnet after the interrupter was actuated and the coil, normally designed only for intermittent duty, would burn out.

Another problem found in the prior art ground fault circuit interrupters was attributable to the use of contact reset mechanisms which permitted a user to open and reset the contacts at will. To insure utmost reliability in a ground fault circuit interrupter, it is desirable that the contact tripping mechanism be subject to limited duty, i.e., only when a ground fault occurs. Prior art ground fault circuit interrupters permitted a user to open the contacts manually in the absence of a ground fault thereby offering the temptation for the user to use the reset mechanism as a switch for turning an appliance on or off from the power outlet. Such use often resulted in the deterioration of the contacts and compromised the reliability of the ground fault circuit interrupter.

SUMMARY OF THE INVENTION

The previously mentioned problems associated with ground fault circuit interruptions of the prior art are overcome by the instant invention which includes a resettable circuit breaker having normally closed main contacts, means for connecting a load to one side of said contacts, means for connecting a power line to the other of said contacts, means for interrupting the connection between the load and power line by opening the contacts in response to a predetermined change in the current in the power line and means for resetting (closing) the contacts in the absence of the predetermined change in current. Ground fault circuit interrupters embodying the invention may include a differential transformer for sensing a current imbalance between the phase and neutral power lines to which the ground fault circuit interrupter is connected, sensor circuitry for providing an output signal when the current imbalance exists for a predetermined time at a predetermined magnitude, and a SCR responsive to the output of the sensor circuitry. The SCR is in circuit with the coil of a latching relay according to the invention to cause the contacts to open when the SCR conducts in response to a current imbalance. Auxiliary contacts responsive to the main contacts are provided for preventing application of current to the relay coil after occurrence of a ground fault irrespective of whether the ground fault circuit interrupter is properly wired in circuit.

The relay includes an armature slidably and pivotally mounted within a frame and connected to a coil spring. A separate spring assembly connects the armature to a rocking member on which one of the contacts is mounted, the rocking member being pivotal with respect to the chassis of the ground fault circuit interrupter to rotate in one direction to open the contacts when the armature of the relay is unlatched upon energization of the coil and to rotate in the opposite direction to close the contacts when the armature of the relay is depressed and held in a latched position under the tension of the coil spring.

It is, therefore, an object of the invention provide a resettable circuit breaker for use in a ground fault circuit interrupter wherein current flow is immediately interrupted upon completion of a circuit between ground and either the phase or neutral connections to a load.

Another object of the invention is to provide a ground fault circuit interrupter which can be conveniently packaged for installation in a standard wall outlet receptacle.

Still another object of the invention is to provide a ground fault circuit interrupter which actuates in response to the magnitude of current flow in an unwanted external circuit and the time during which external current flow occurs.

A further object of the invention is to provide a ground fault circuit interrupter immune to coil burn-out when installed in reverse.

A still further object of the invention is to provide a ground fault circuit interrupter with a compact yet positive resettable latching relay for permitting current flow from a power line to a load only in the absence of ground faults.

An additional object of the invention is to provide a tease-proof ground fault circuit interrupter which, once reset into a conducting condition, cannot be rendered nonconducting absent the occurrence of a ground fault.

Other and further objects of the invention will be apparent from the following drawings and description of a preferred embodiment of the invention in which like reference numerals are used to indicate like parts in the various views.

DESCRIPTION OF THE DRAWINGS

FIG. 2 is a front view of the ground fault circuit interrupter of the invention;

FIG. 3 is a sectional view of the apparatus of the invention, showing the apparatus of the invention in one state of operation in its intended environment;

DESCRIPTION OF THE PREFERRED EMBODIMENTS

Figure 1:
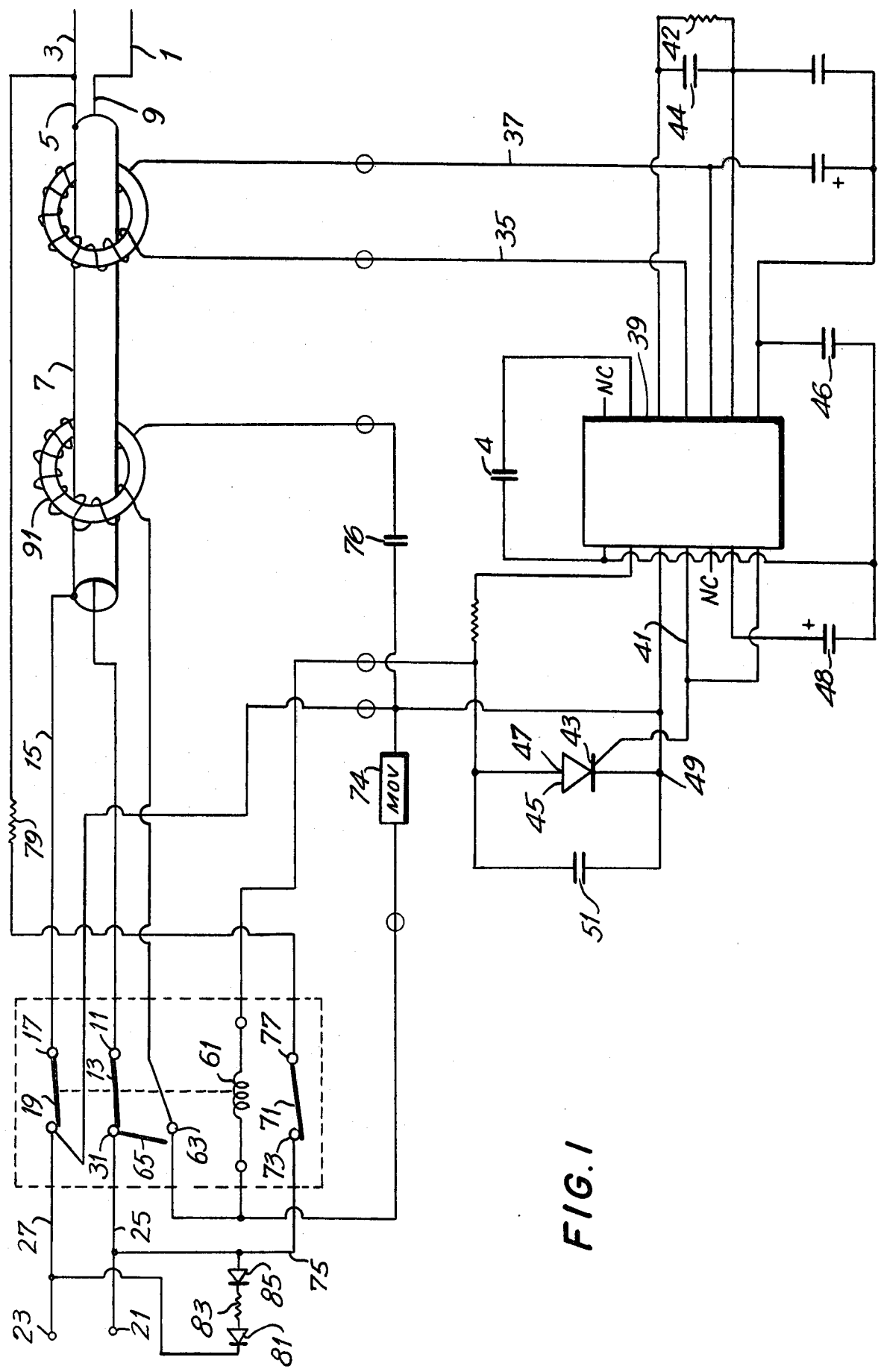
FIG. 1 is an electrical circuit schematic diagram of the apparatus of the invention.

Referring now to the circuit schematic wiring diagram of FIG. 1 of the drawings, there are shown input terminals 1 and 3 which are respectively connected to the phase and neutral wires of a 60 cycle a.c. power line as, for example, an electrical supply circuit leading from a fuse box in a residence or commercial building. The neutral terminal 3 is connected by a lead 5 to the outer conductor of a coaxial cable 7 at the line end of the cable. The outer conductor of the cable 7 can be a rigid conducting hollow cylindrical conduit. The center conductor or phase lead 9 of the cable 7 is connected to the phase terminal 1 at its line end and to a contact 11 of a relay actuated switch 13 at its load end. A conductor 15 is connected at its line end to the load end of the outer conductor of the cable 7 and at its load end to a contact 17 of a switch 19 which is structurally combined with the switch 13 for joint actuation with it as will later be described.

Load terminals 21 and 23 are respectively connected to a load phase wire 25 and a load neutral wire 27. The load phase wire 25 and load neutral wire 27 are respectively connected to contact 31 of the switch 13 and contact 29 of the switch 19. The switches 13 and 19 are normally closed providing electrical continuity between input terminal 1 and output terminal 21 and between input terminal 3 and output terminal 23. Upon occurrence of a ground fault, the switches 13 and 19 are opened interrupting the flow of current between contacts 17 and 29 and between contacts 11 and 13 as will subsequently be explained.

A differential transformer 33 has a core circumscribing the neutral wire 5 and hot wire 9 which serve as the transformer primaries and a secondary winding having output leads 35 and 37 which are connected to the input of a ground fault circuit interrupter sensing circuit 39. Capacitor 44 provides the necessary feedback for the integrator portion of the circuit 39. The circuit 39 as shown in FIG. 1 can be a Motorola MC3426 which is commercially available. National Semi Conductor Inc. (NSI) makes and sells an integrated circuit LM1850 functionally similar to the Motorola circuit which can also be purchased and used in a circuit similar to that of FIG. 5 but modified slightly in accordance with known requirements of the NSI circuit.

Noise suppression for the circuit 39 is provided by resistor 42 and capacitor 46. Capacitor 48 provides filtration for the circuit 39. The output of the circuit 39 is applied via lead 41 to the gating stage 43 of a silicon controlled rectifier (SCR) 45 having an anode 47 and a cathode 49. Capacitor 51 connected in parallel with the SCR 45 provides noise suppression for the SCR 45.

A difference in the respective currents flowing through the primaries of the transformer 33 induces a voltage pulse in the secondary winding which appears across leads 35 and 37 and is applied to the circuit 39 where it is integrated, and if the pulse is of sufficient magnitude and duration, a pulse is generated at the output of the circuit 39 on line 41 and applied to the gating stage 43 to render the SCR 45 conducting.

The coil 61 of an electromagnet is connected between the anode 47 of the SCR 45 and an auxiliary contact 63 which is connectable to the contact 31 by a plunger actuated switch 65. The switch 65 is mechanically coupled with switches 13 and 19 in a manner to be described so that switches 13, 19 and 65 all open when coil 61 is energized and all close when the coil 61 is de-energized and the contacts are reset as will later be described. When the SCR 45 is rendered conducting in response to a current imbalance in the leads 5 and 9, it causes switches 19, 13 and 65 respectively connected between contacts 17 and 29, contacts 11 and 31, and contacts 31 and 63 to open and remain open, irrespective of whether the coil 61 remains energized or is de-energized, until the switches 19, 13 and 65 are manually reset.

A normally open plunger actuated test switch 71 is provided between a contact 73 which is connected by line 75 to the load phase wire 27 and a contact 77 which is connected through a resistor 79 to the line neutral lead 5. Closing of the switch 71 provides a path for current to flow from the phase wire 25 to ground through the neutral lead 5 bypassing the transformer 33. A current imbalance then exists between the current flowing in the outer conductor 7 and the current flowing in the inner conductor 9. This current imbalance is sensed by the differential transformer 33 which causes the contacts associated with switches 13, 19 and 65 to open as previously described.

The series combination of a light-emitting diode 81, a resistor 83 and diode 85 is connected in parallel with the load terminals 21 and 23 and is lit when the switches 13 and 19 are closed and power is applied to the line terminals 1 and 3 of the ground fault circuit interrupter. The lit LED 81 provides a visual indication that the circuit in which the ground fault circuit interrupter is installed is operating normally, i.e., without any ground fault. Upon occurrence of a ground fault which causes the switches 13, 19 and 65 to open power to the LED 81 is cut off and the light is extinguished. An extinguished LED provides a visual indication that a fault exists in the circuit.

The LED can also be used to test for reverse installation of the ground fault circuit interrupter. Should the load terminals 21 and 23 be inadvertently connected to the power line and the line leads 1 and 3 mistaken for the load leads, the LED 81 will remain lit at all times, even after the test button 71 is actuated since power will be continuously applied to the terminals 21 and 23 across the light-emitting diode circuit.

The disclosed circuit, by employing auxiliary switch 65 between the contacts 31 and 63 to selectively connect the relay coil 61 to the load phase wire 25, prevents burn-out of the coil 61 upon an inadvertent reversed connection of the ground fault circuit interrupter. If the load side of the coil 61 were permanently connected to load phase wire 25, inadvertent reverse connection of the ground fault circuit interrupter, whereby the load terminals 21 and 23 would be connected directly to the power line, would result in a continuous flow of current through the coil 61, even after the contact switches 13 and 19 were tripped. This would likely result in burnout of the coil 61 which is intended only for intermittent duty. Under the arrangement shown in FIG. 1, even if power is supplied directly to the load terminals 21 and 23, once the interrupter trips opening switches 13 and 19, mechanically coupled switch 65 also opens thereby preventing current flow to the coil 61 and, hence, avoiding its burning out.

A power transformer 91 axially displaced from the transformer 33 also circumscribes the outer and inner conductors 7 and 9 for detecting the completion of a neutral to ground circuit at the load. Such an occurrence can result in current flow from the ground to which the line side of the neutral wire 5 is connected, to the line side of the neutral 5, to the load side of the neutral 5, to the unwanted external ground, and back to the original ground to which the line side of the neutral wire 5 is connected. The primary winding of transformer 91 is connected between load phase wire contact 31 through auxiliary switch 65, and load neutral contact 29 through switch 19. The primary winding of the transformer 91 is connected in series with a capacitor 76 and a metal oxide varistor 74 is connected in parallel with the load for voltage transient suppression. When a ground to neutral circuit is completed, current flows in it induced by the inductively coupled transformer 91. The flow of current causes an imbalance between the currents in the neutral and phase conductors adjacent transformer 33 and is sensed in the same manner as a ground fault as previously described.

The mechanical operation of a ground fault circuit interrupter according to the invention will now be described with reference to FIGS. 2, 3, 4 and 5.

Referring to FIG. 2, there is shown the face or outlet side of an electrical outlet or receptacle adapted to receive two a.c. grounding plugs each of which is connected to an appliance or load. The outlet also has a reset button 101 which, when depressed, closes the mechanically coupled switches 13, 19 and 65. The test button 71 is also accessible from the face of the outlet for causing an intentional ground fault for testing the interrupter as previously explained. The light-emitting diode 81 can be seen on the face of the outlet panel and will normally be lit when the interrupter is in a reset condition, that is, when the reset button 101 has been depressed and there has been no subsequent ground fault, and will be extinguished when and after a ground fault occurs. To test the unit when it is in a reset condition, the test button 71 is pressed at which time, if the unit is properly installed, the light-emitting diode 81 should change from a lit to an extinguished state. Pressing the reset button 101 should restore the terminated power to the outlet and cause the LED 81 to be lit again.

Referring now to FIG. 3, the ground fault circuit interrupter of the invention is contained in a lower housing 103 and an upper housing 105 which mates with the lower housing 103 to form a substantially enclosed casing for the mechanical and electronic components of the ground fault circuit interrupter.

The reset button 101 has an upper surface 106 which is adapted to have applied to it finger pressure to close the switches 13, 19 and 65. A metal frame 107 has a floor 109 and two vertical spaced parallel side members 111 extending transversely from opposite edges of the floor 109. The side planar members 111 of the frame 107 each have a symmetric slot 113 with the uppermost edge of each of the slots 113 having an inclined region 115 and a horizontal region 117 laterally displaced from the inclined region 115. The laterally displaced edge regions 115 and 117 of the slot 113 are separated by a shoulder 119. The slot 113 tapers along the downward inclination of the edge region 115 toward the shoulder 119 and then abruptly widens at the shoulder 119 where the edge region 117 of the slot 113 is vertically displaced from the edge region 115.

An armature 116 is pivotally connected at one of its ends to the reset button or plunger 101 and has the other of its ends slidably disposed in each slot 113 of the frame 107. The armature 116 is substantially rectangular in shape with four ears projecting outwardly in parallel directions from each of the four corners of the armature 116. Opposite ears 121 are rotatably disposed in circular apertures 123 formed in the side walls of the reset button 101 and opposite ears 125 are slidably disposed in the slots 113 of the frame 107. The edge of the armature 116 between the ears 125 is provided with a hook-like member which may be formed by notching and bending a portion of the armature material to receive one end 127 of a coil spring 129. The other end 131 of the coil end 127 of a coil spring 129. The other end 131 of the coil spring 129 is hooked over a notched member 133 which is formed of one of two inward-directed frame portions 135 which are connected to the frame vertical members 107 and which are in parallel spaced relationship to the floor 109 of the frame 107. The coil spring 129 is disposed in a space between the mutually inwardly-directed frame members 135 and when tensioned by stretching urges the edge of the armature from which the ears 125 project in an oblique direction toward the outlet side of the ground fault circuit interrupter and away from the floor 109 of the frame 107.

As a result of the angular relationship between the axis of the spring 135 and the plane of the armature 116, the force exerted by the tensioned spring 135 on the armature 116 has two vector components, one parallel to the plane of the armature 116 and the other transverse to that plane. The parallel vector component urges the armature and reset button or plunger 101 in a direction to move the reset button 101 into a raised position projecting beyond the outer side of the ground fault circuit interrupter receptacle while the transverse vector component urges the ears 125 against the edge regions 115 or 117 of the slot 113 depending upon the degree of depression of the armature 116. As the reset button 101 is pressed inwardly from the face or outlet side of the ground fault circuit interrupter, the armature 116 is also forced inwardly and each ear 125 moves along a respective edge region 115 of a slot 113 until it passes a shoulder 119 at which point it is abruptly pulled against corresponding edge region 117 of the slot 113 where it is held by the force of the spring 135 against respective shoulder 119, the shoulder 119 serving as a latch point for the latching ears 125.

In order for the latching ears 125 to be freed from the latch points at the shoulders 119, they must be moved in a direction transverse to the plane of the armature, that is, the armature must be pivoted about pivot ears 121 in apertures 123 toward the frame floor member 109. An electromagnet including coil 61 wound about a cylindrical core 62 is affixed to the frame floor member 109 by means of a rivet 141 with the axis of the electromagnet being vertical and substantially transverse to the variable plane of the movable armature 116. The coil 61 is normally de-energized as previously explained with reference to FIG. 1 and when energized, exerts an attractive force on the armature 116 which is made of a magnetizable metal.

The armature 116 is placed in a latched position by depressing the reset button 101 which thereby forces the latching ears 125 passed the shoulder 119 to latch adjacent side edge regions 117 under the force of the spring 135 which becomes tensioned as the armature moves inwardly. When the coil 61 is energized, the armature 116 is attracted to the core 62. The armature 116 pivots on ears 121 in apertures 123 until the ears 125 clear the shoulder 119 at which time the armature 116 and reset button 101 move abruptly outward with the reset button 101 then projecting beyond the face of the receptacle and the ears 125 being contained against respective vertical edges 143 of the slots 113.

When the armature is depressed by applying pressure to the surface 105 of the reset button 101, the edge of the armature 116 between ears 125 engages two outwardly extending prongs 151 (in the drawings one prong 151 is hidden by the other) of a leaf spring 153. The leaf spring 153 has a surface parallel and proximate to the face of the receptacle which is substantially H-shaped with downwardly extending prongs 151 comprising two spaced lower parallel legs of the H and opposite upwardly extending legs 155 entrapped under tension behind either side of the lip 159 of a support member 157 which is mounted on a vertical wall 160 which is fixedly connected to the lower housing 103. The lip 159 cooperates with two inward extending projections at the distal ends of the legs 155 of the leaf spring 153 to partially tension the leaf spring 153 and keep the legs 155 trapped beneath the lip 159. Another prong 161 of the leaf spring 153 projects from the crossbar of the H-shaped leaf spring first towards the legs 151 and then bends under and back towards the legs 155 and is urged against the wall 160.

The crossbar of the H-shaped spring 153 is apertured at 163 to receive one end of a substantially V-shaped wire spring 165. The other end of the spring 165 is disposed in a notch 167 formed in a projection 168 extending from the middle of a rocking member 169 which supports line contacts 11 (visible in FIGS. 3 and 5) and 17 (hidden in FIGS. 3 and 5). The rocking member 169 is substantially L-shaped at either of its ends (the face of one end being visible in FIGS. 3 and 5) and deep enough to permit mounting of two rivets 170 on opposite sides of projection 168 each of which affixes one leg of a respective L-shaped conductor to a parallel face of the rocking member 169, the conductors supporting contacts 11 and 17 on their transverse legs. When the ground fault circuit interrupter is in a latched condition with the reset button 101 depressed and ears 125 of the armature 116 entrapped at the catch points 119 in the slots 113, the armature 116 exerts an inward pressure on the legs 151 of the H-shaped springs 153 thereby tilting the attached end of the wire spring 165 downwardly so that its other end urges the notched portion 167 of the rocking member 169 upwardly. The rocking member 169 is urged, at all times, against a pivot member 171 which is affixed to the wall 160 in spaced relationship to the support member 157 and which has a downward extending lip 172 which overhangs an upwardly extending lip 174 on the middle portion of the L-shaped rocking member 169. The rocking member 169 is, as a result of the dispositions of the support member 157 and pivot member 171 confined by the tension in the spring 165 between the members 169 and 171. The lip 174 of the rocking member 169 intermediate the contacts 11 and 17 is shortened and abuts against a corner of the pivot member 171 to form a pivot region 173 about which the rocking member 169 can be rotated relative to the pivot member 171. Rotation of the rocking member 169 is limited in one direction by the support member 157 and in the other direction at least initially by the engagement of the respective contacts. The wire spring 165 urges the rocking member 169 towards the pivot member 171 and, when the legs 151 of the H-shaped spring 153 are depressed by the armature 116, urges the rocking member 169 to pivot away from the supporting member 157 thereby causing the contacts 11 and 17 to rotate toward load contacts 31 and 29 (behind 31 in FIGS. 3 and 5) to complete a circuit between the line and load terminals of the ground fault circuit interrupter.

A spring loaded plunger 181 is disposed beneath one of the legs 155 of the H-shaped spring 153 so that when the legs 151 of the H-shaped spring 153 are under pressure of the armature 116, the plunger 181 is depressed thereby causing a resilient conductor 183 which is connected to the contact 31 to engage contact 63 thereby closing the auxiliary contacts which connect the relay coil 61 to the load side of the phase wire 25.

Figure 4:
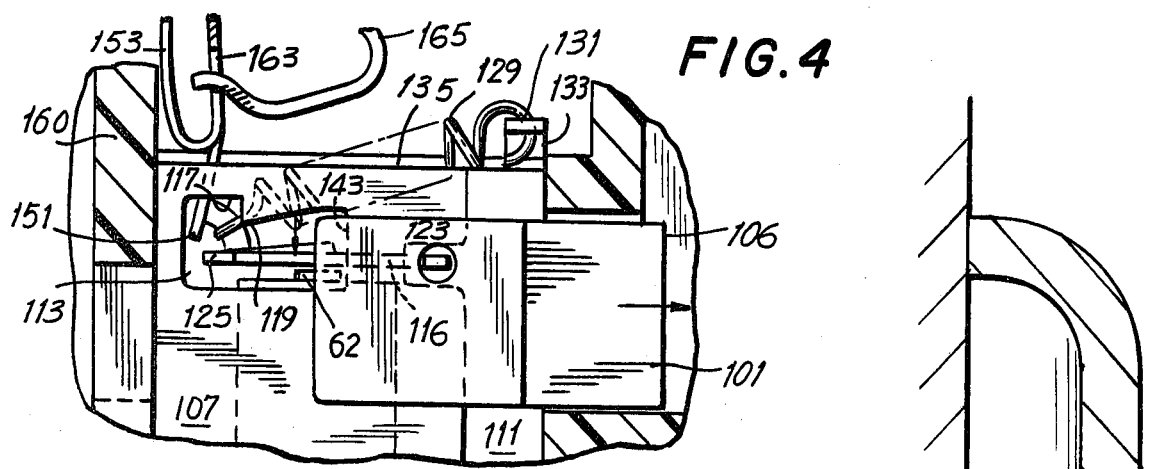
FIG. 4 is a sectional view similar to the view of FIG. 3 of a part of the apparatus during transition to another state of operation in its intended environment.
Figure 5:
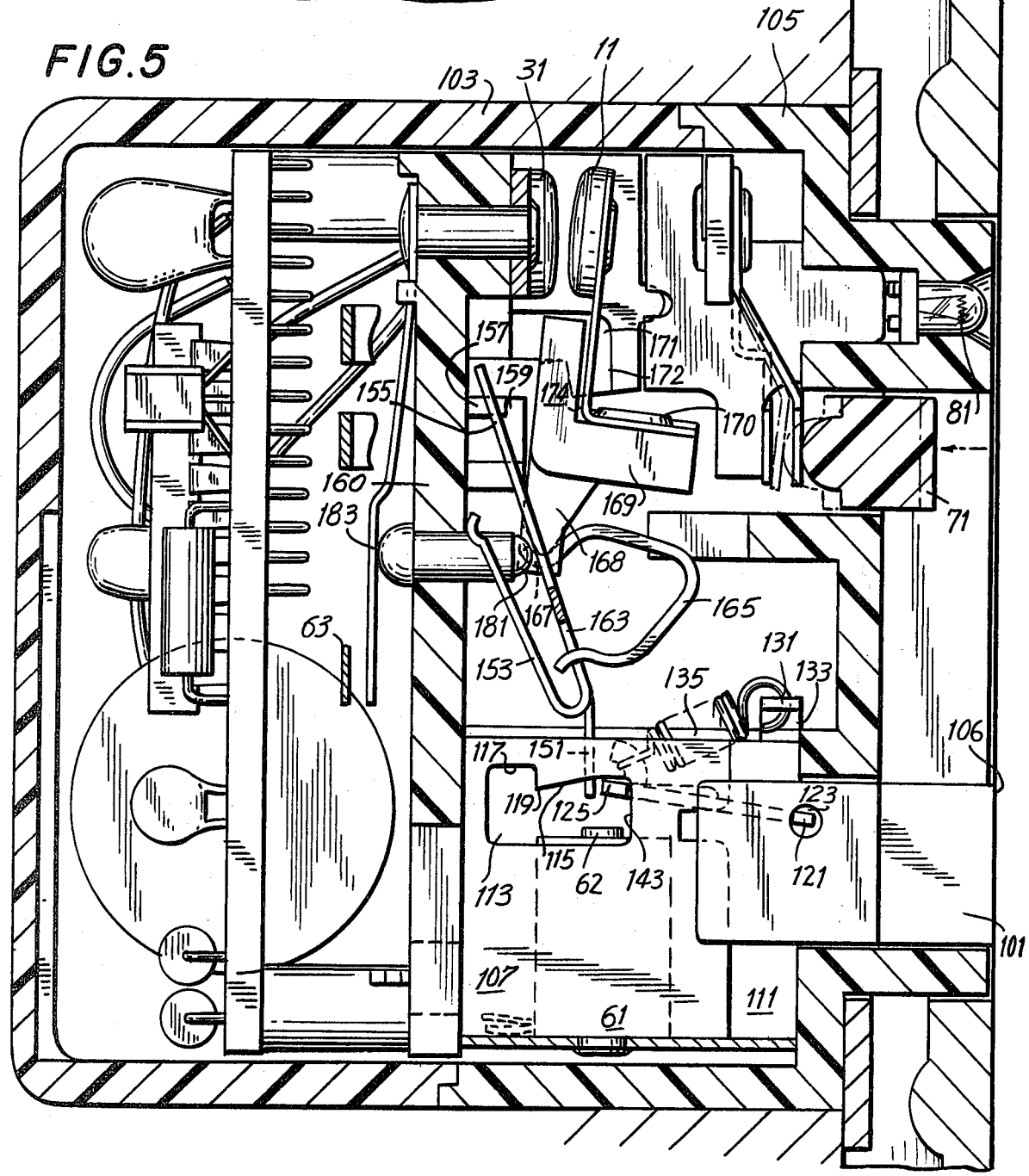
FIG. 5 is a view similar to FIG. 3 showing the apparatus after the completion of transition to its other state.

Upon occurrence of a ground fault, the coil 61 is energized as previously described and the armature 116 is attracted to it. The armature begins to rotate until the ears 125 clear the latch point on the shoulder 119 in the frame 107 at which time the armature 116 begins to move longitudinally toward the face of the receptacle urged by the spring 135, as shown in FIG. 4. Linear motion of the armature continues until the ears 125 engage edge 143 of the slot 113 in the frame 107 as shown in FIG. 5.

With the armature 116 in a raised position, pressure on the arms 151 is reduced and the H-shaped spring 153 rotates upwardly about a fulcrum formed between the legs 155 of the H-shaped spring and the support member 157. Pressure on the auxiliary contact button 181 is then relieved and the spring loaded plunger 181 moves longitudinally permitting the biased contact arm 183 to separate from the auxiliary contact 63 thereby breaking the electrical connection between auxiliary contacts 31 and 63.

As the H-shaped spring 153 rotates upwardly the wire spring 165 is tilted so that the notched end portion of the rocking member 169 is urged inwardly thereby pivoting about the pivot member 171 and causing the main contacts 11 and 31, and 17 and 29 to open. Switches 13 and 19 which were referred to in connection with the discussion of the schematic diagram of FIG. 1 comprise the rocking member 169, pivot member 171, support member 157, springs 153, 165 and 135, armature 116, frame 107 and reset button 101. Switch 65 comprises the foregoing in combination with plunger 181 and flexible bias contact arm 183.

It will be appreciated that the previously described circuit interrupting mechanism although illustrated in the environment of a ground fault circuit interrupter can be utilized with or without the sensors 33 and 91 in other environments including circuit breakers intended to trip upon circuit overload. It will further be appreciated that the foregoing description is of one preferred embodiment of the invention which can be applied in other embodiments and which is to be limited only by the following claims.

What is claimed is:

1. In a resettable circuit breaker having at least one pair of normally closed contacts, first means for connecting a load to one of said contacts of said pair, second means for connecting a source of electric current to the other of said contacts of said pair, said second means including means for interrupting the connection between said current source and said other contact in response to a predetermined change in said current, and means for resetting the connection between said current source and said other contact, said resetting means including a movable member having a surface adapted to have applied to it a pressure for movement thereof, the improvement which comprises:

a frame having a planar central member and two spaced parallel side planar members extending transversely from opposite edges of said central member, said side planar members each having a slot, one side of each said slot having first and second laterally displaced edges and a shoulder separating said laterally displaced edges, a support to which said frame is fixedly mounted, an armature pivotally connected to said movable member at one end and having spaced from said pivot connection a pair of oppositely extending ears slidably disposed within said respective slots, a coil spring connected at one end to said armature and at the other end to said frame, the axis of said spring being oblique to the direction of movement of said ears in said slot so that said spring, when tensioned, has one force component urging said ears in a direction parallel to said direction of movement and another force component urging said ears in a direction substantially transverse to said direction of movement and towards said one side of each said slot, the edge of each shoulder adjacent each second edge of each said slot providing a latching point for said ears, said coil spring urging said ears towards said latching point and said second edge when said ears are slid from said first edge to said second edge, said coil spring urging said armature in said direction of movement away from said second edge when said ears are displaced transversely from said second edge beyond said shoulder, rocker means for supporting a first of said pair of contacts, said rocker means including a rocking member having lip means, a pivot support member fixedly mounted with respect to said base, said pivot support member having intersecting surfaces adapted to loosely receive said lip means of said rocking member, a second support member fixedly mounted to said base and spaced from said pivot support member having a surface adapted to engage a surface of said rocking member, a spring means in engagement with said rocking member, said base and said armature, said spring means urging said rocking member against said pivot support means and being movable in response to movement of said armature to urge said rocking member to rotate into engagement with said second support member when the ears of said armature are in engagement with the first edges of said slots and to urge said rocking member to rotate away from said second support member when the ears are urged in engagement with the second edges of said slots, one of said pair of contacts being mounted on said rocking member and the other of said pair of contacts being mounted on said base, said contacts being urged into mutual engagement when said rocking member is urged away from said second support member and being urged apart when said rocking member is urged against said second support member, and an electromagnet mounted on said frame in spaced relationship to said armature and energized in response to said predetermined change in current for transversely displacing said ears from said second edge of said slot to a position beyond said shoulder thereby causing said contacts to separate.

2. In a resettable circuit breaker having at least one pair of normally closed contacts, first means for connecting a load to one of said contacts of said pair, second means for connecting a source of electric current to the other of said contacts of said pair, said second means including means for interrupting the connection between said current source and said other contact in response to a predetermined change in said current and means for resetting the connection between said current source and said other contact, said resetting means including a movable member having a surface adapted to have applied to it a pressure for moving said member, the improvement which comprises:

a base, a frame member fixedly mounted on said base, an armature pivotally connected to said movable member at one end and slidably mounted in said frame at its other end for movement between one position and another position, a coil spring connected at one end to said armature and at its other end to said frame, cooperating means on said armature and on said frame for latching said armature with respect to said frame to prevent slidable movement therebetween when said armature is moved to said one position, rocking means for supporting a first of said pair of contacts, said rocking means being pivotally mounted with respect to said base, said base supporting the other of said pair of contacts, said rocking means being rotatable in response to movement of said armature so that when said armature is in said one position said contacts are engaged and when said armature is in said another position said contacts are disengaged, and an electromagnet fixedly mounted with respect to said base, said magnet being responsive to said predetermined change in current for unlatching said armature and allowing it to be moved from said one position thereby causing said contacts to disengage.

3. Apparatus according to claim 2 wherein said frame has a central planar member and two spaced parallel side planar members extending transversely from opposite edges of said central planar member, said side planar members each being slotted to slidably receive said armature, and said electromagnet is mounted on said frame.

4. Apparatus according to claim 3 wherein said slots are each provided with a shoulder and said armature has ears slidable in said slots, said spring urging said armature against said shoulder when said ears are on one side of said shoulder thereby latching said armature in place and urging said armature away from said shoulder when said armature is moved transversely passed said shoulder in response to energization of said electromagnet.

5. Apparatus according to claim 4 and further comprising second spring means connected between said armature and said rocking means for urging said rocking means to rotate into a contact-engaging position when said armature is latched in said slots and for causing said rocking means to rotate into a contact-disengaging position when said armature is unlatched in response to said electromagnet.

* * * * *